June 7, 1932.    O. G. SIMMONS    1,862,202
METHOD OF CUTTING THE TEETH OF GEARS
Filed Nov. 20, 1929    5 Sheets-Sheet 2

INVENTOR:

June 7, 1932.  O. G. SIMMONS  1,862,202
METHOD OF CUTTING THE TEETH OF GEARS
Filed Nov. 20, 1929  5 Sheets-Sheet 5

INVENTOR:

Patented June 7, 1932

1,862,202

UNITED STATES PATENT OFFICE

OLIVER G. SIMMONS, OF LAKEWOOD, OHIO

METHOD OF CUTTING THE TEETH OF GEARS

Application filed November 20, 1929. Serial No. 408,526.

This invention relates to a method of cutting the teeth of gears. In a helical gear the teeth are disposed at an angle with respect to the axis, these gears being more commonly but incorrectly called spiral gears in the shop and referred to by others as gears with twisted teeth. It is well understood by engineers, however, that the teeth are arranged on the curve of the helix, for the reason the teeth are cut in a cylindrical body in which the lead of advance of the teeth for practical commercial purposes is made uniform. In a spur gear the teeth are straight. These gears are intended to translate motion from one shaft to another, all of which is well understood in the art.

The present invention has for an object to provide a method of generating, with a standard straight tooth gear shaped cutter or a standard straight tooth gear shaper cutter, both spur gears and gears with helical teeth disposed at any helix angle, and further to gentrate tooth faces such that all gears cut by the same cutter, or any other gear shaper cutter or gear shaped cutter conjugate to the same rack, will mesh with each other.

A further object of the invention is to provide a method of generating straight tooth or twisted tooth gears with a gear shaper cutter or a gear shaped cutter by which the cutter has true generating action on the curves of the tooth faces being generated on the gear blank during the feed of the cutter.

A further object of the invention is to provide a method which lessens the mechanical difficulties in the cutting or forming of gears of either straight teeth or teeth twisted to any angle and by which the gears may be cut or formed with greater economy and accuracy.

The apparatus for practicing my invention utilizes a gear shaped cutter in which the teeth are not twisted to the angle of helix corresponding to the helical angle of the teeth of the blank to be cut or formed but are preferably straight teeth extending longitudinally of the cutter axis.

A characteristic aspect of the gear shaped cutter utilizable in the apparatus in the practice of my invention resides in the fact that a standard commercial straight tooth cutter, as distinguished from a twisted tooth cutter, of a normal pitch corresponding to the normal pitch of any spur or helical gear, may be used to generate or form the teeth in a gear blank for either spur gears or helical gears of any angle of helix, disregarding entirely the helical angle of the helical gear. A spur gear shaped cutter, therefore, in the practice of my invention, of a given pitch may be used to cut or form the teeth of any helical gear of a given normal pitch. The normal pitch of the helical gear, therefore, is the determining factor in the practice of my invention in the utlization of a given pitch straight tooth cutter.

The present invention contemplates imparting to a spur gear shaped cutter continuously rotating in one direction and to a gear or work blank relative movements comprising a rapid relative reciprocation of the cutter and blank transversely of their faces;—one stroke of the reciprocation being a cutting stroke with the cutter in cutting contact with the blank, the other stroke being a non-cutting return stroke with the cutter out of cutting contact with the blank, the cutter or blank, preferably the cutter, being given a movement at the beginning of said return stroke to separate the cutter and blank and a movement at the commencement of the cutting stroke to bring the cutter and blank into cutting engagement;—simultaneously slowly moving in a curvilinear direction the cutter or blank, or both, to bring, in one instance, the axes of the cutter and blank closer together, and, in another instance, to bring points on the axes of the cutter and blank closer together; continuing said last movement in the same curvilinear direction to move said axes or said points on the axes apart; and rotating the work meanwhile on an axis disposed at an angle to the axis of the cutter corresponding to the helical angle of the teeth desired in the blank, in one aspect of the invention—namely in the last instance above mentioned or rotating the work on an axis disposed parallel to the axis of the cutter to produce the straight teeth of spur gears in the blank, in another aspect of the invention—namely in the first instance above mentioned.

The present invention has for an object to provide a method of generating with a standard straight tooth gear shaper cutter or gear shaped cutter, gears with straight or twisted teeth by simultaneously rotating the cutter and blank in the proper correlated ratio and of rapidly reciprocating the cutter across the face of the blank, simultaneously slowly moving the cutter in a curvilinear path tangentially across the face of the blank to generate or form conjugate teeth therein. This curvilinear tangential movement of the cutter across the face of the blank causes either the axes of the cutter and blank to approach each other or points on said axes to approach each other and when continued in the same direction causes the axes or said points on the axes to separate from each other.

From the foregoing it is understood that in the practice of my method the straight teeth of a spur gear will result if the axes of the work spindle and cutter spindle are adjusted to and secured in parallel positions, not angular, one with the other, and that the twisted teeth of the helical or spiral gear will result if the aforesaid axes are adjusted to and secured in a position at an angle to each other. In my present method, therefore, forming the subject matter of this specification, the straight teeth in a spur gear, or the helical teeth in a helical gear, will be produced dependent upon the adjustment of the axis of the work spindle with respect to the axis of the cutter spindle, or vice versa.

Reference is made to my copending application, filed March 24, 1927, Serial No. 178,021, for Method of cutting gear teeth, issued June 24, 1930 as Patent No. 1,765,385 and reissued March 31, 1931, as Re18,021 on a reissue application filed September 10, 1930, Serial No. 481,041, and to my copending application, filed November 21, 1927, Serial No. 234,788, for Method of generating gears, issued June 23, 1931 as Patent 1,811,568, in which applications the simultaneous movement of the cutter or gear blank to bring the axes or points on the axes of each closer together and of continuing the movement in the same direction to move said axes or said points on the axes apart, is along a line, illustrated as a straight line in the drawings, tangent to the pitch circles of the blank and cutter.

With the above and other objects in view the invention comprises the method herein disclosed and illustrated in the accompanying drawings and hereinafter described and particularly set forth in the appended claims, together with such variations and modifications thereof as will be apparent to those skilled in the art to which the invention appertains.

The drawings accompanying this specification are for the purpose of illustration only.

Referring to the drawings, Fig. 1 is a plan view of one arrangement illustrating the method used to cut a helical gear, with a schematic diagrammatic portion showing in dotted lines the position of the cutter at the beginning of the cutting operation and in mesh with the curvilinear imaginary rack shown by dot and dash line, said imaginary rack also meshing with the finished helical gear, and showing also the position of the cutter in mesh with said imaginary rack after it has completed the cutting of the teeth of the helical gear referred to.

Figure 1:
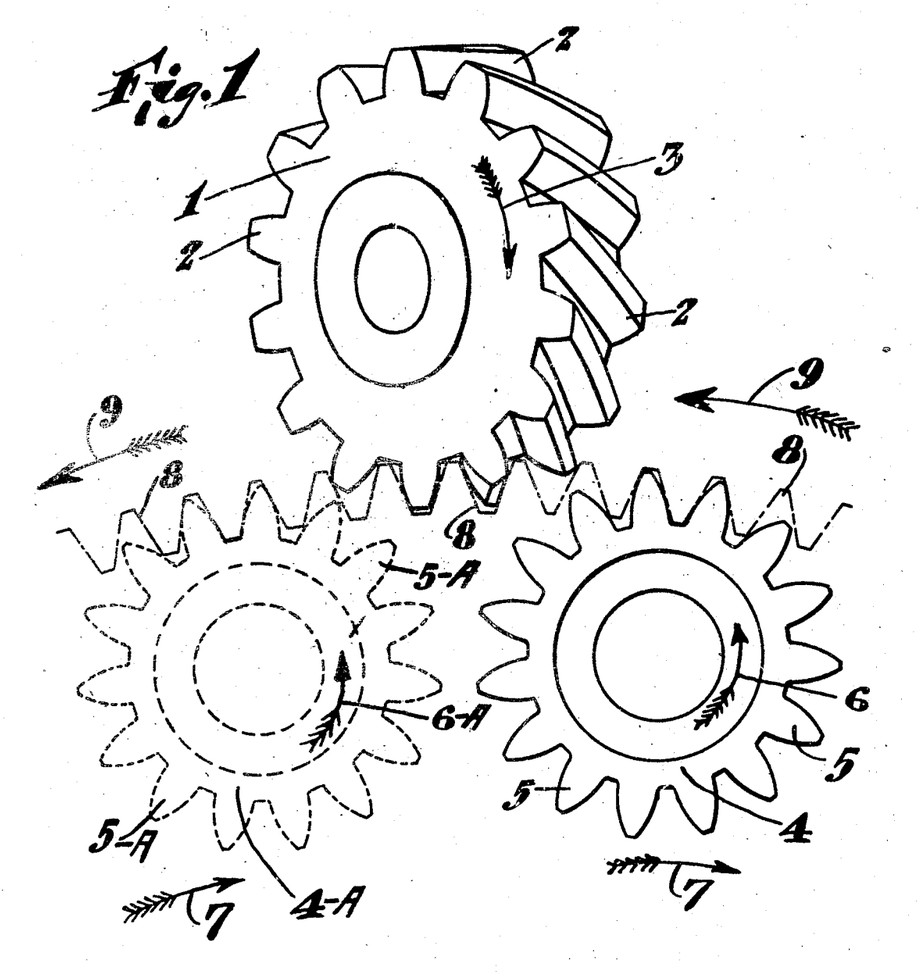

Referring to Fig. 1, the helical gear 1 is provided with the twisted teeth 2 and is adapted to rotate slowly on its axis in the direction of the arrow 3. The teeth 2 of the gear 1 are shown in the drawings as having been cut completely by means of the spur gear shaped cutter 4 which is provided with the teeth 5. The cutter 4 may be what is known commercially as a gear shaper cutter or it may be any suitable gear shaped cutter.

Figure 2:
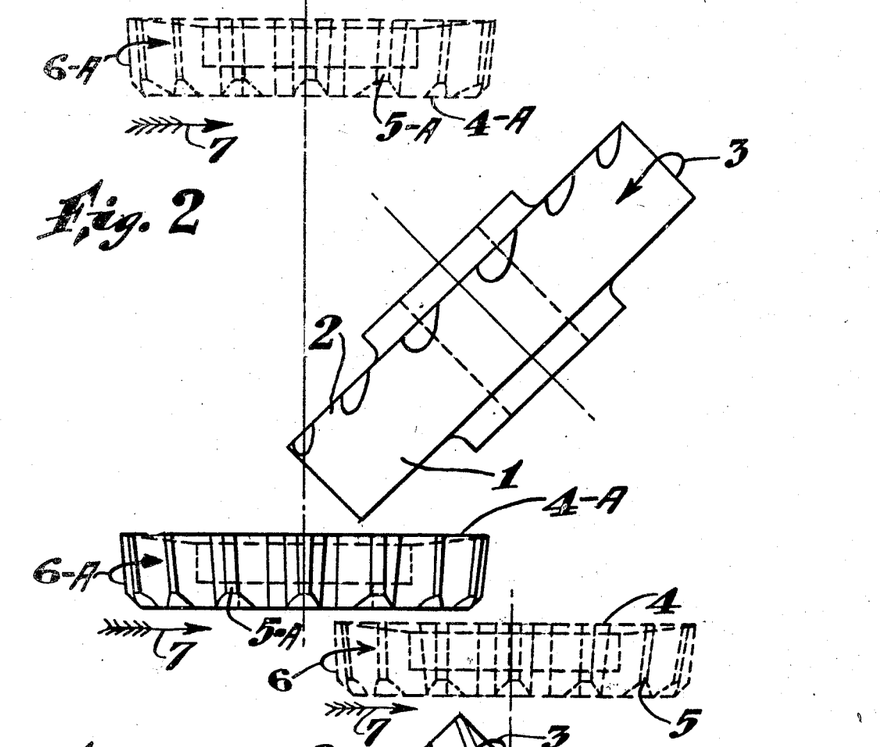
Fig. 2 is an end view of Fig. 1, viewed from the foot of the sheet, showing the position of the gear blank and the gear shaped cutter at the beginning of the cutting of the teeth.

The position of the cutter 4 as shown in the drawings, Fig. 1, is substantially the position of the cutter after it has completed the cutting of the teeth 2 of the helical gear 1. In this method the first position of the cutter 4 in cutting the teeth 2 of the helical gear 1 is indicated by the numeral 4—A. The cutter in this position is shown and represented by dotted lines and is assumed to be rapidly reciprocating toward and away from the observer a required measure of distance to clear the gear 1, as illustrated in Fig. 2.

The gear shaper cutter 4—A is also rotating in the direction of the arrow 6—A and slowly moving bodily in the curvilinear direction indicated by the curvilinear arrow 7, the rotary movement 3 of the helical gear 1 and the rotary movement 6—A of the gear shaped cutter 4—A being of such velocity as would be obtained if the gear 1 and cutter 4—A were meshing as shown with the curvilinear imaginary rack 8, while the curvilinear rack 8 is moving in the curvilinear direction of the arrow indicated by the numeral 9, so that the cutter 4—A rotating continuously in the direction of the arrow 6—A, slowly moves in the curvilinear direction indicated by the curvilinear arrow 7, from the position of the cutter 4—A to the position of the cutter 4. The curvilinear movement of the cutter and blank first causes points on the axes of the cutter and blank to come closer together and upon a continuation of such movement to then move apart.

In the foregoing movements it will be observed that the rotation of gear 1 and cutter 4, with intermeshing rack 8, is continuous. The imaginary curvilinear rack 8, therefore, and its curvilinear movement in the curvilinear direction indicated by the arrow 9 is continuous.

Figure 4:
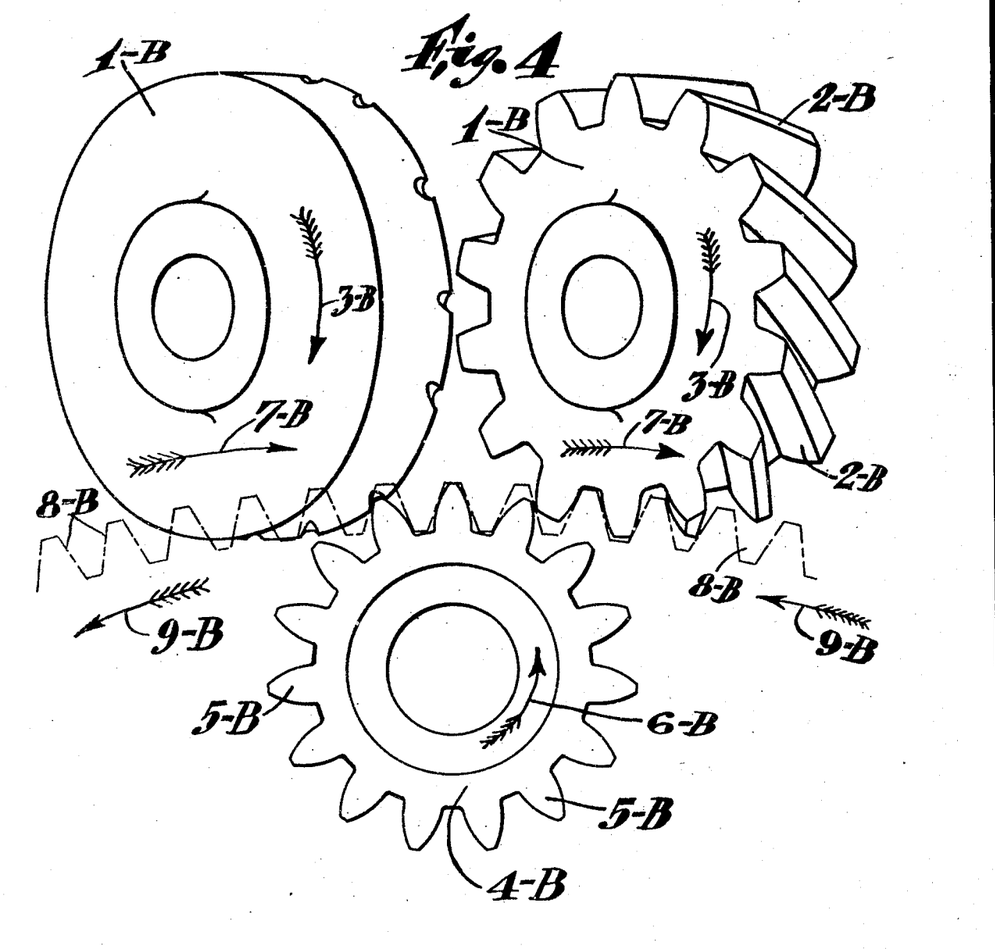
Fig. 4 is a plan view similar to Fig. 1, except that the helical gear is shown as having the two positions occupied by the cutter of Fig. 1; namely, before and after the teeth are cut.

It is obvious that I could just as readily continuously rotate and move the gear 1 in mesh with its continuously moving imaginary rack across and into and out of cutting contact with the reciprocating rotating cutter as I have moved the cutter in mesh with the rack into and out of cutting contact with the gear as described. This is illustrated in the drawings, Fig. 4, the gear, cutter and other elements being indicated by the same reference numerals followed by a dash and the capital letter B.

It is also obvious that I can, by the method herein described, dispose the axes of the cutter and blank in parallel positions one with the other and produce the straight teeth of spur gears. This is illustrated in Fig. 5, the gear, cutter and other elements being indicated by the same reference numerals followed by a dash and the capital letter C.

Figure 5:
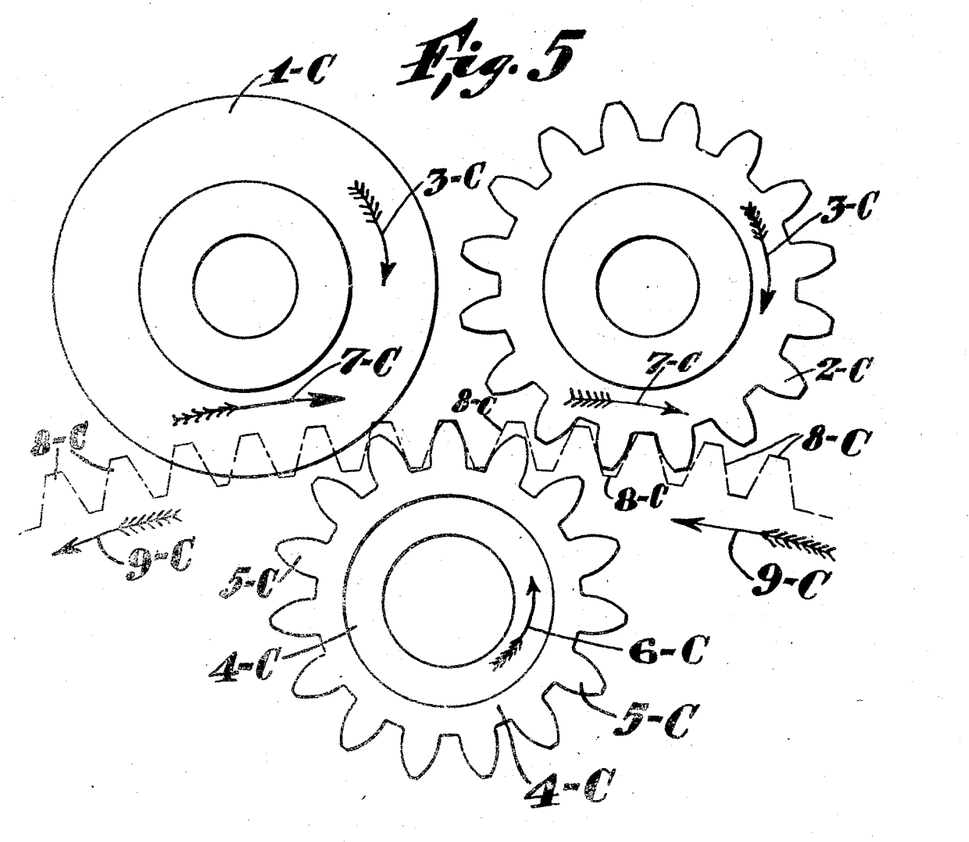
Fig. 5 is a plan view similar to Fig. 4, except that a spur gear having straight teeth is shown in two positions; at the beginning of the cutting of the teeth and after the teeth in the gear have been fully cut by the cutter.

The straight teeth of a spur gear illustrated in Fig. 5 will result if the axes of the work spindle and cutter spindle are adjusted and secured in parallel positions, not angular, one with the other. By the expression secured in parallel positions, with reference to Fig. 5, I mean, by way of example, that the axes of the work and cutter spindles are perpendicular to the surface of the sheet of drawing and are secured in said adjusted positions. The same movements, however, as referred to will continue and the axis of one will approach the axis of the other until finally the minimum measure of distance between said axes is reached. The movements continuing as described therefore, will increase the measure of distance between said axes. In this movement the axes of the work spindle and cutter spindle will always be perpendicular to the sheet of the drawing of Fig. 5 and therefore parallel to each other.

The position of the cutter 4—A as it begins to cut the teeth of the gear 1 is illustrated in Fig. 2, and it will be observed that the position of the cutter 4—A is shown, for purposes of illustration, to the left of the gear 1, and on its lowermost position of the stroke, the cutter is shown in full lines, and at the top of this stroke, it is represented by dotted lines.

Figure 3:
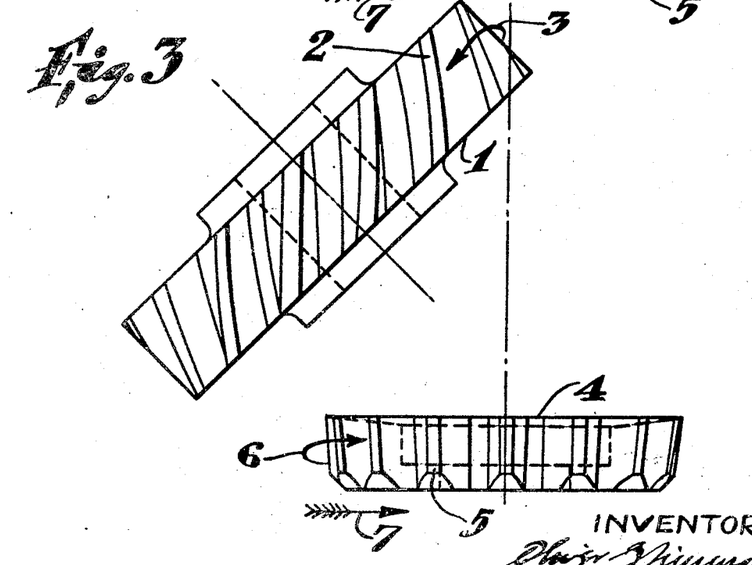
Fig. 3 is similar to Fig. 2, except in this view the gear shaped cutter is shown as having completed the cutting of the helical teeth in the gear.

In Fig. 3 the teeth 2 of the gear 1 are shown as having been completed by the cutter 4, thus Fig. 3 corresponds substantially to the position of the gear 1 and the cutter 4 of Fig. 1, and Fig. 2 corresponds substantially to the position of the gear 1 and cutter 4—A of Fig. 1.

Figure 6:
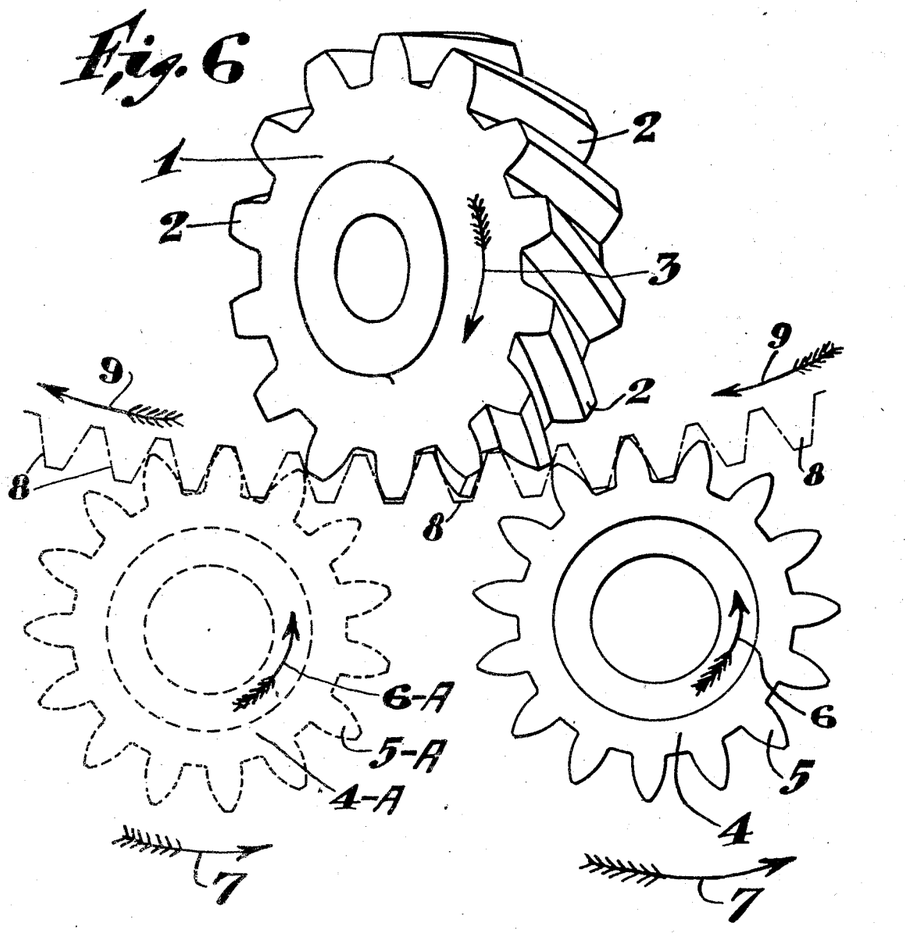
Fig. 6 is similar to Fig. 1, except the curvilinear imaginary rack is inverted.

It is also obvious that I can by the method herein described invert the curvilinear continuously slowly moving rack 8 and practice my present method with equal facility. This is illustrated in Fig. 6 in which the same reference numerals indicate the same parts as in Fig. 1.

Straight tooth or twisted tooth gears cut in accordance with the present invention will roll on the curvilinear rack conjugate to the gear shaper cutter employed in cutting them, and all gears of the same helix angle cut with straight tooth gear shaper cutters conjugate to the same curvilinear rack will mesh properly with each other.

The tooth faces of the spur gear and the helicoid tooth faces of the helical gear cut in accordance with the present invention are the same generically as would be cut in the methods of the prior art by a helical gear shaper cutter conjugate to the same rack as the straight tooth cutter employed in the present method.

It is quite obvious that if the helicoid tooth faces of the helical gear cut in accordance with the present invention are adapted to be used as cutting teeth, the helical gear produced by this invention could be used as a cutter to produce, by the method of the present invention, conjugate rack or intermeshing conjugate straight tooth gears by simply reversing the cutter and blank, thereby producing a straight tooth involute gear with a helical tooth gear shaper cutter.

The method of the present invention requires less complicated machinery since the rates of rotation of the cutter and blank are independent of the speed of the cutting stroke, while in machines of the prior act for cutting gears with a helical gear shaper cutter, the speed of rotation of the cutter must be correlated with the speed of the longitudinal movement of the cutter during the cutting stroke as well as with the speed of rotation of the blank.

A further very important feature of the invention is the provision of the method of slowly feeding the cutter to the blank in a curvilinear path by which the generating relationship is maintained during the feed, so that when the pitch circles of the cutter and spur gear being cut come into tangential cutting contact, the generation of the spur gear is completed, and with respect to the generation of helical gears it is obvious that the generation of the teeth of a helical gear will be completed when all elements of the pitch cylinder of the helical gear will have come into tangential cutting contact with the elements of the pitch circle of the cutter.

Having thus described my invention, I claim:

1. A method of cutting helical gear teeth in a gear blank by rotating a gear shaped cutter in one direction and reciprocating the cutter across the face of the gear blank, one stroke of which reciprocating movement is in effect a cutting stroke in cutting contact with the gear blank, while the other stroke is non-effective, that is non-cutting, it being a return of the cutter to the original position, and at the beginning of this last stroke, giving the cutter an additional movement to withdraw it from contact with the gear blank, to be again moved into position to effect contact during the cutting stroke, simultaneously moving the cutter or gear blank along a curvilinear line to bring the cutter and gear blank closer together and of continuing this movement along the said curvilinear line in the same direction to move said cutter and blank apart, the gear blank meanwhile rotating on an axis disposed at an angle to the axis of the cutter corresponding to the helical angle of the teeth desired in the gear blank, the rotary motion of said cutter and said gear blank being of such velocity as would result if the teeth of said cutter and the resultant generated teeth of the gear blank were constantly in mesh with a continuously moving imaginary rack having a curvilinear pitch line.

2. The herein described method of cutting teeth in gear blank by rotating a gear shaped cutter on its axis and reciprocating the cutter across the face of a gear blank rotating on its axis in intermeshing relation with said cutter and with a curvilinear imaginary rack moving in one direction, gradually moving the axis of the cutter and blank closer together by moving either the cutter or the blank, or both, along a curvilinear rack with which said cutter and blank are in constant intermeshing relation.

3. The herein described method of cutting teeth in gear blanks by rotating a gear shaped cutter on its axis and reciprocating the cutter across the face of a gear blank rotating on its axis in intermeshing relation with said cutter, and with a curvilinear imaginary rack moving in one direction, gradually moving the axes of the cutter and blank closer together by moving either the cutter or the blank, or both, along a curvilinear rack with which said cutter and blank are in constant intermeshing relation, and maintaining the rotation of the cutter and blank during such movements at speeds corresponding to the speeds at which the cutter and blank would be driven by their curvilinear intermeshing conjugate rack moving between them along a curvilinear line tangentially of the pitch circles of the cutter and blank.

4. The herein described method of cutting teeth in a gear blank with a gear shaped cutter which comprises rotating the cutter and gear blank at different speeds in opposite directions with the peripheral speeds of the cutter and gear to be generated, one slightly in excess of the other, imparting a relative curvilinear movement to said cutter and blank along a common curvilinear line tangent to their pitch circles at a rate corresponding to the relative movement which the cutter and gear to be generated would have if in mesh with an imaginary longitudinally moving curvilinear rack common to the cutter and gear, and simultaneously reciprocating the cutter across the blank.

5. The herein described method of cutting teeth in a gear blank with a gear shaped cutter which consists in moving the cutter and blank relatively to each other along a common curvilinear line tangent to the pitch circle of the cutter and the pitch circle of the gear to be cut, from a position in which the cutter is clear of the blank to a position in which said pitch circles are tangent, separating the cutter and blank by continuing said movement in the same direction, reciprocating the cutter across the blank during such movement and rotating the cutter and blank at such relative speeds that the relative curvilinear movement corresponds to the relative movement which the cutter and gear would have if simultaneously meshing with the imaginary moving curvilinear rack common to the gear and the cutter.

6. The herein described method of cutting helical teeth in a gear blank with a gear shaped cutter having longitudinally straight teeth which comprises positioning the cutter with its axis at an angle to the axis of the blank corresponding to the angle of the helix of the teeth to be cut, rotating the cutter and blank in intermeshing relation to each other and in intermeshing relation with an imaginary curvilinear rack, the pitch circles of the cutter and the blank being tangent to the pitch line of the curvilinear imaginary rack, reciprocating the cutter in the direction of its axis across the face of the blank and imparting to the gear and blank a relative curvilinear movement transversely with respect to the cutter axis along the imaginary curvilinear rack conjugate to the gear and blank.

7. A method of cutting teeth in gear blanks by rotating a gear shaped cutter on its axis in intermeshing relation with a gear blank rotating on its axis, relatively reciprocating the cutter and blank while intermeshed transversely of their faces and moving the axes of the cutter and blank closer together by a relative feeding movement along a curvilinear line tangent to the pitch circles of the cutter and gear blank and continuing this movement in the same direction to move said axes apart.

8. A method of cutting teeth in gear blanks by rotating a gear shaped cutter on its axis, and in intermeshing relation with a gear blank rotating on its axis, relatively reciprocating the cutter and blank transversely of their faces, and moving the cutter and blank closer together by a relative feeding movement along a curvilinear line tangent to the pitch circles of the cutter and gear blank and continuing this movement in the same direction to move said cutter and blank apart.

9. A method of cutting teeth in a gear blank by rotating a gear shaped cutter on its axis in intermeshing relation with a gear blank rotating on its axis, the axes of the cutter and gear blank being disposed angularly with respect to each other, relatively reciprocating the intermeshed cutter and blank transversely of their faces and moving the cutter and blank closer together by a relative feeding movement along a curvilinear line tangent to the pitch circles of the cutter and gear blank and continuing this movement to move said cutter and blank apart.

10. A method of cutting teeth in gear blanks by rotatitng a gear shaped cutter on its axis in intermeshing relation with a gear blank rotating on its axis, relatively reciprocating the cutter and blank transversely of their faces, one stroke of such reciprocating movement being in effect a cutting stroke with the blank and gear in contact, the other stroke of such movement being in effect a return non-cutting stroke with the blank and cutter out of contact, gradually relatively moving the cutter and blank along a curvilinear line tangent to the pitch circles of the cutter and blank to move said cutter and blank closer together, continuing this movement to move said cutter and blank apart, and maintaining the rotation of the cutter and blank during the cutting strokes at speeds corresponding to the speeds at which they would be driven by their intermeshing curvilinear conjugate rack moving tangentially of the pitch circles of the cutter and blank.

11. A method of cutting gear teeth in a gear blank by rotating a gear shaped cutter and reciprocating the cutter across the face of the gear blank, one stroke of such reciprocating movement constituting a cutting stroke with the cutter in cutting contact with the gear blank while the other stroke constitutes a non-effective, non-cutting stroke and is a return of the cutter to its original position, imparting to the cutter at the beginning of this last stroke an additional movement to withdraw it from contact with the gear blank to be again moved into position to effect contact during the cutting stroke, simultaneously moving the cutter or gear blank along a curvilinear line to bring the axes of the cutter and gear blank closer together and continuing this movement along the said curvilinear line in the same direction to move said axes apart, the gear blank meanwhile rotating on an axis parallel to the axis of the cutter, the rotary motion of said cutter and said gear blank being of such velocity as would result if the teeth of said cutter and the resultant generated teeth of the gear blank were constantly in mesh with a continuously moving imaginary rack having a curvilinear pitch line.

12. The herein described method of cutting teeth in gear blanks by rotating a gear shaped cutter on its axis and reciprocating the cutter across the face of the gear blank rotating on its axis in intermeshing relation with said cutter and with a curvilinear imaginary rack moving in one direction, and gradually moving the cutter and blank closer together by moving either the cutter or the blank or both along a curvilinear rack with which said cutter and blank are in constant intermeshing relation.

13. The herein described method of cutting teeth in gear blanks by rotating a gear shaped cutter on its axis and reciprocating the cutter across the face of a gear blank rotating on its axis in intermeshing relation with said cutter and with a curvilinear imaginary rack moving in one direction, the axes of the cutter and blank being angularly disposed with respect to each other, and gradually moving the cutter and blank closer together by moving either the cutter or the blank or both along a curvilinear rack with which said cutter and blank are in constant intermeshing relation.

14. The herein described method of cutting teeth in gear blanks by rotating a gear shaped cutter on its axis and reciprocating the cutter across the face of a gear blank rotating on its axis in intermeshing relation with said cutter and with a curvilinear imaginary rack moving in one direction, gradually moving the cutter and blank closer together by moving either the cutter or the blank or both along a curvilinear rack with which said cutter and blank are in constant intermeshing relation, and maintaining the rotation of the cutter and blank during such movements at speeds corresponding to the speeds at which the cutter and blank would be driven by their curvilinear intermeshing conjugate rack moving between them along a curvilinear line tangentially of the pitch circles of the cutter and blank.

15. The herein described method of cutting teeth in gear blanks by rotating a gear shaped cutter on its axis and reciprocating the cutter across the face of a gear blank rotating on its axis in intermeshing relation with said cutter and with a curvilinear imaginary rack moving in one direction, the axes of the cutter and blank being angularly disposed with respect to each other, gradually moving the cutter and blank closer together by moving either the cutter or the blank or both along a curvilinear rack with which said cutter and blank are in constant intermeshing relation, and maintaining the rotation of the cutter and blank during such movements at speeds corresponding to the speeds at which the cutter and blank would be driven by their curvilinear intermeshing conjugate rack moving between them along a curvilinear line tangentially of the pitch circles of the cutter and blank.

16. The herein described method of cutting teeth in a gear blank with a gear shaped cutter which comprises rotating the cutter and gear blank at different speeds in opposite directions with the peripheral speeds of the cutter and gear to be generated, one slightly in excess of the other, imparting a relative curvilinear movement to said cutter and blank along a common curvilinear line tangent to a pitch circle of the cutter and a pitch circle of the gear to be generated at a rate corresponding to the relative movement which the cutter and gear to be generated would have if in mesh with an imaginary longitudinally moving curvilinear rack common to the cutter and gear, and simultaneously relatively reciprocating the cutter and gear blank transversely of their faces.

17. The herein described method of cutting teeth in a gear blank with a gear shaped cutter which comprises moving the cutter and blank relatively to each other along a common curvilinear line tangent to a pitch circle of the cutter and a pitch circle of the gear to be cut, from a position in which the cutter is clear of the blank to a position in which said pitch circles are tangent, separating the cutter and blank by continuing said movement in the same direction, relatively reciprocating the cutter and blank transversely of their faces during such movement, and rotating the cutter and blank at such relative speeds that the relative curvilinear movement corresponds to the relative movement which the cutter and gear would have if simultaneously meshing with an imaginary moving curvilinear rack common to the gear and the cutter.

18. The herein described method of cutting helical teeth in a gear blank with a gear shaped cutter having longitudinally straight teeth which comprises positioning the cutter with its axis at an angle to the axis of the blank corresponding to the angle of the helix of the teeth to be cut, rotating the cutter and blank in intermeshing relation to each other, moving the cutter and blank relatively to each other along a common curvilinear line tangent to a pitch circle of the cutter and a pitch circle of the gear to be cut from a position in which the cutter is clear of the blank to a position in which said pitch circles are tangent, separating the cutter and blank by continuing said movement in the same direction, relatively reciprocating the cutter and blank transversely of their faces during such movement, and rotating the cutter and blank at such relative speeds that the relative curvilinear movement corresponds to the relative movement which the cutter and gear would have if simultaneously meshing with the imaginary moving curvilinear rack common to the gear and cutter.

19. A method of cutting teeth in gear blanks comprising rotating a gear shaped cutter having longitudinally straight teeth on its axis in intermeshing relation with a gear blank rotating on its axis, relatively reciprocating the cutter and blank while intermeshed transversely of their faces and moving the axes of the cutter and blank closer together by a relative feeding movement along a curvilinear line tangent to the pitch circles of the cutter and gear blank and continuing this movement in the same direction to move said axes apart.

20. A method of cutting teeth in a gear blank comprising rotating a gear shaped cutter having longitudinally straight teeth on its axis in intermeshing relation with a gear blank rotating on its axis, the axes of the cutter and gear blank being disposed angularly with respect to each other, relatively reciprocating the intermeshed cutter and blank transversely of their faces, moving the cutter and blank closer together by a relative feeding movement along a curvilinear line tangent to the pitch circles of the cutter and gear blank, and continuing said last named movement to move said cutter and blank apart.

In testimony whereof I affix my signature.
OLIVER G. SIMMONS.